(12) United States Patent
Paquet et al.

(10) Patent No.: US 7,788,209 B2
(45) Date of Patent: Aug. 31, 2010

(54) HYBRID FAULT REASONING AND GUIDED TROUBLESHOOTING SYSTEM THAT USES CASE-BASED REASONING AND MODEL-BASED REASONING

(75) Inventors: Michel D. Paquet, Milton, FL (US);
Baban V. Baliga, Glastonbury, CT (US);
Ravi Rajamani, West Hartford, CT (US); Andrew Paul Gagnon, West Hartford, CT (US)

(73) Assignee: United Technologies Corporation, Hartford, CT (US)

(*) Notice: Subject to any disclaimer, the term of this patent is extended or adjusted under 35 U.S.C. 154(b) by 369 days.

(21) Appl. No.: 12/114,896

(22) Filed: May 5, 2008

(65) Prior Publication Data
US 2009/0276387 A1    Nov. 5, 2009

(51) Int. Cl.
*G06F 9/44* (2006.01)
(52) U.S. Cl. ......................................... 706/52
(58) Field of Classification Search .................. 706/45, 706/20, 62, 52
See application file for complete search history.

(56) References Cited

U.S. PATENT DOCUMENTS

| | | | |
|---|---|---|---|
| 5,822,204 A * | 10/1998 | Yamada | 700/50 |
| 6,012,152 A * | 1/2000 | Douik et al. | 714/26 |
| 6,421,719 B1 * | 7/2002 | Lewis et al. | 709/224 |
| 6,456,928 B1 | 9/2002 | Johnson | |
| 6,539,337 B1 | 3/2003 | Provan | |
| 6,909,960 B2 | 6/2005 | Volponi | |
| 7,136,809 B2 | 11/2006 | Volponi | |
| 7,216,071 B2 | 5/2007 | Volponi | |
| 7,233,884 B2 | 6/2007 | Volponi | |
| 7,277,838 B2 | 10/2007 | Volponi | |
| 2004/0064425 A1 | 4/2004 | Depold | |
| 2004/0064426 A1 | 4/2004 | Depold | |
| 2006/0047403 A1 | 3/2006 | Volponi | |
| 2007/0094219 A1 * | 4/2007 | Kipersztok | 706/52 |

* cited by examiner

*Primary Examiner*—David R Vincent
(74) *Attorney, Agent, or Firm*—Carlson, Gaskey & Olds

(57) ABSTRACT

A fault reasoning system combines both a model-based reasoning approach based upon predicted root causes of a plurality of fault signals, and a case-based reasoner that looks at the actual root cause of actual cases.

14 Claims, 2 Drawing Sheets

HYBRID FAULT REASONING AND GUIDED TROUBLESHOOTING SYSTEM THAT USES CASE-BASED REASONING AND MODEL-BASED REASONING

The government may have certain rights to this invention pursuant to Contract No. N00019-02-C-3003 awarded by the United States Air Force.

BACKGROUND OF THE INVENTION

This application relates to a fault reasoning and guided troubleshooting system, which combines aspects of model-based reasoning, and case-based reasoning to provide a hybrid approach.

One method of identifying faulty components in large systems, such as gas turbine engines, is called "fault reasoning". This is the process of estimating the root cause of a problem in a system based upon a set of faults, or symptoms. As an example, a number of sensors may be placed throughout a system, such as a gas turbine engine, and provide signals to a fault reasoner. The signals could provide indications of potential faults or problems throughout the system. For instance, unusually high or low temperatures, unusually high or low pressures, etc. may be sent to the fault reasoner. The combination of these faults would indicate particular problem(s) within the system. It is the goal of the fault reasoning system to predict what may be failing based upon the combination of faults.

One known fault reasoning system is a so-called model-based reasoner. A model-based reasoner is based upon a model of the system, and provides potential solutions to the combination of faults based upon modeling of the system. Thus, a model-based reasoner might be fully functional and operational even before a new piece of equipment has been deployed.

A case-based reasoner is based on real life experience, and matures as the equipment ages. As equipment ages, it is typical that more and more faults occur, and corresponding repairs must be put in place. Thus, a case-based reasoner is more effective after a piece of equipment has been operational for a period of time than it may have been initially.

The case-based reasoner, once it has built an adequate database, tends to emulate the results predicted by a model-based reasoner. On the other hand, the model-based reasoner is more likely to be able to make a better prediction of a particular root cause(s) based upon a combination of faults than is a case-based reasoner, especially in early stages of operation of a new piece of equipment.

SUMMARY OF THE INVENTION

In a disclosed embodiment of this invention, the combination of model-based reasoning and case-based reasoning is utilized to predict a root cause for a particular set of fault codes. In this way, the benefits of each of the individual systems are achieved, as are synergistic benefits from the combination.

These and other features of the present invention can be best understood from the following specification and drawings, the following of which is a brief description.

DETAILED DESCRIPTION OF THE PREFERRED EMBODIMENT

The present invention is a fault reasoning system that can be utilized on any equipment. In one particular application, the fault reasoning system is utilized on a gas turbine engine. An example gas turbine engine is illustrated in FIG. 1.

Figure 1:
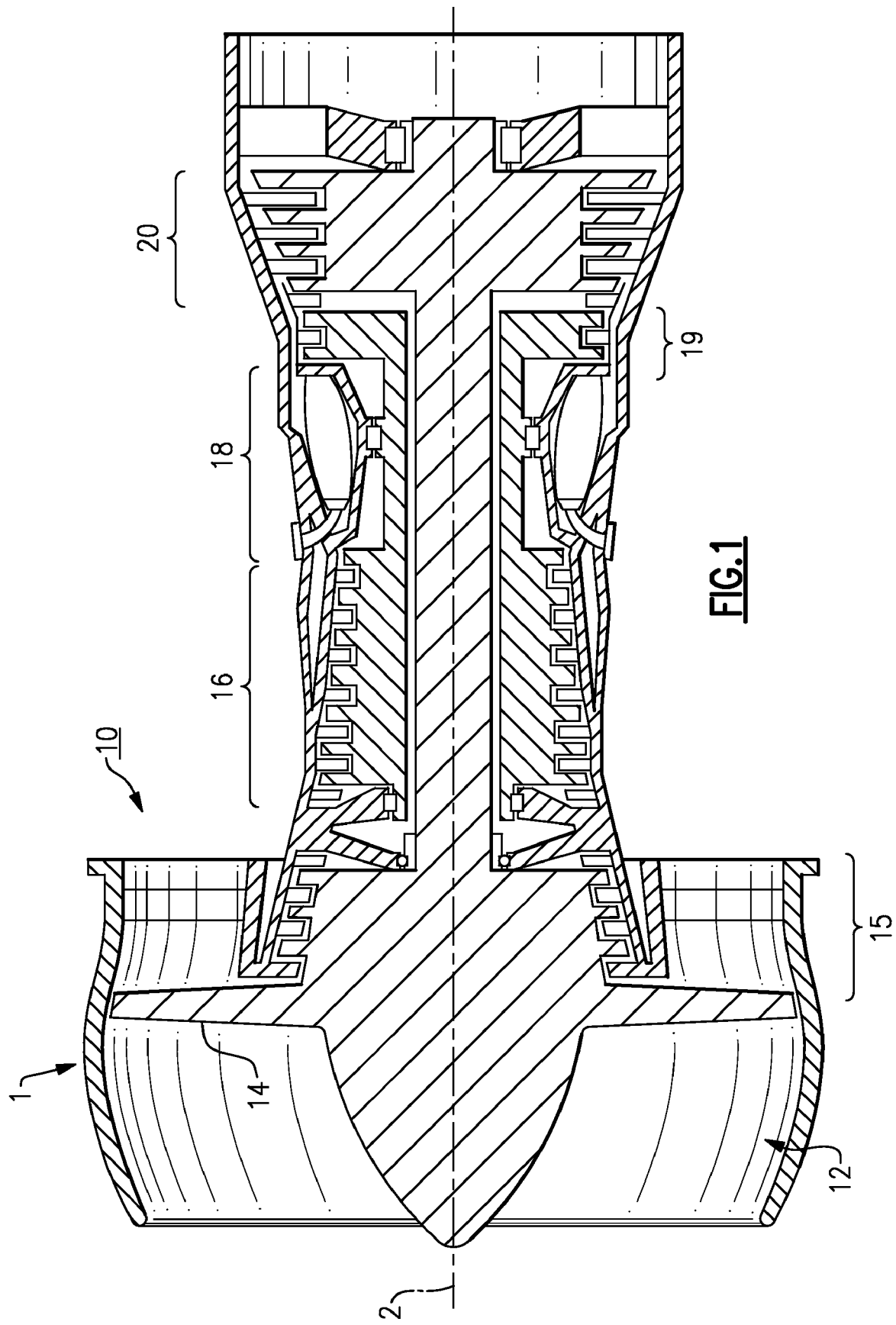
FIG. 1 is a schematic view of a gas turbine engine incorporating the present invention.

A gas turbine engine 1, such as a turbofan engine, circumferentially disposed about an engine centerline, or axial centerline axis 2 is shown in FIG. 1. The engine 1 includes an inlet 12, a fan 14, a low pressure compressor 15, a high pressure compressor 16, a combustion section 18, a high pressure turbine 19, and a low pressure turbine 20. As is well known in the art, air in the inlet, is compressed first by the fan. Some of the air enters the fan duct (10) and some enters the low pressure compressor 15. The core air (air entering the low pressure compressor) is compressed by the low pressure compressor 15 and then the high pressure compressor 16. It is mixed with fuel, burned in the combustion section, expanded in the high pressure turbine 19 and finally in the low pressure turbine 20. The air that bypasses the low pressure compressor and exits through the fan duct 10. The high pressure turbine includes rotor 22 which rotates in response to the expansion, driving the high pressure compressor. Similarly the low pressure turbine drives the low pressure compressor and the fan. It should be understood that this view is included simply to provide a basic understanding of the sections in a gas turbine engine, and not to limit the invention.

Figure 2:
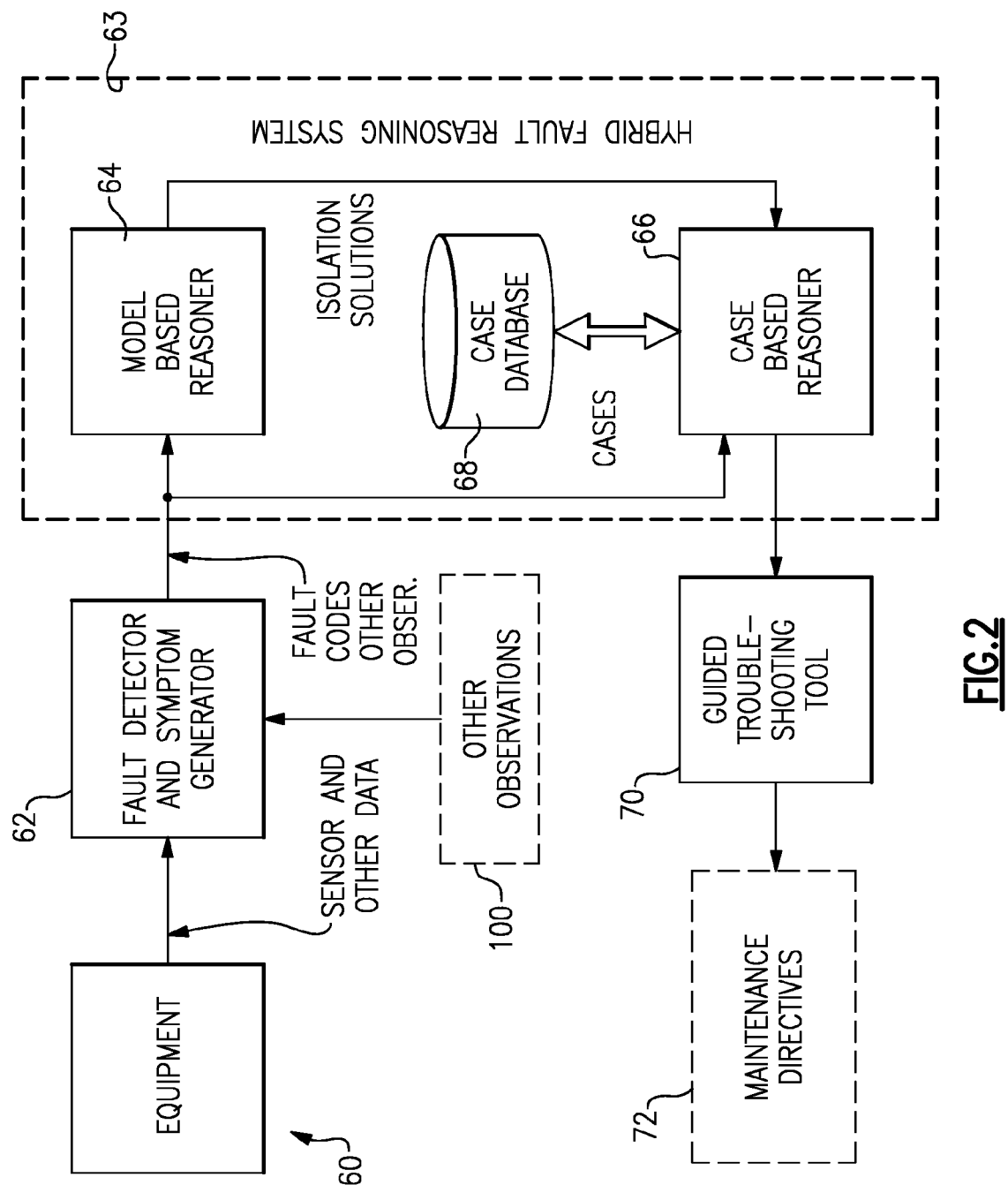
FIG. 2 is a schematic of a fault reasoning system.

A modern gas turbine engine has sensors associated with each of the various sections. Thus, as shown in FIG. 2, the equipment 60 may be a gas turbine engine, and the equipment 60 may send a number of sensor signals and other data to a fault detector and symptom generator 62. Generator 62 sends fault codes into the hybrid fault reasoning system 63. Also, other observations 100 may be included. Such other observations may include things that personnel have seen or heard that could provide an indication as to a potential problem with the equipment 60.

Examples of fault codes that might be associated with a gas turbine engine could be unusually high temperatures associated with a compressor section, for example, and unusually low pressures downstream of the compressor section. The hybrid fault reasoning system 63 would have as its goal predicting the root cause of this combination of fault codes, and providing directives to maintenance personnel at 72 as to what is the likely cause of the particular problem. The maintenance directive at 72 could be stored and displayed on a computer, or could be actually directed to maintenance personnel. The system 63 could be dedicated to a gas turbine engine in operation, such as on an aircraft, and could be performing its function while the aircraft is in use. On the other hand, fault reasoning systems are also utilized in a maintenance environment, and are brought to the gas turbine engine on the ground. Again, while a gas turbine engine is specifically disclosed, the hybrid fault reasoning system 63 would have benefit when used with any number of other types of systems.

The model-based reasoner 64 sends an isolation solution to a case-based reasoner 66. The isolation solution would typically predict a likely problem, or problems, with the equipment 60. As an example, based upon the example fault codes mentioned above, the model-based reasoner may send an isolation solution that compressor efficiency appears to be dropping, and may predict any number of root causes at the component level that could result in such a drop in efficiency. This process of taking in the fault codes, and turning them into isolation solutions is known as "inverting."

The case-based reasoner 66 has access to a case database 68. The case database 68 could be dedicated to the case-based reasoner 66, or could be remotely accessible. In particular, if the fault reasoning system 63 is dedicated and mounted on an aircraft, it is likely that a case database 68 might be remotely accessible, rather than mounted on the aircraft. On the other hand, for a factory or maintenance location fault reasoning system 63, the case database 68 might more likely be dedicated to the fault reasoning system 63.

Regardless, the isolation solutions received from the model-based reasoner 64 are studied in the case-based reasoner 66. In addition, the fault codes from the symptom generator 62 may also be sent to the case-based reasoner 66, to assist in cases where the model-based reasoner is unable to find an adequate solution. The case-based reasoner 66 looks at the combination of codes, and determines whether that particular combination of fault codes has been seen before. At that point, if that particular combination has been seen before, then the case-based reasoner predicts the root cause of that particular combination. There is a very high degree of likelihood that the case-based reasoner will accurately predict what needs to be repaired if it does have a previous case that has a similar (but not exact) grouping of fault codes.

A guided troubleshooting tool 70 takes its output from the fault reasoning system 63, and provides a maintenance directive 72. In another embodiment the information about the maintenance directive could come from 66 itself if 70 is included as part of 66.

The case database can be updated when needed (based on field experience), to include any new combination of codes or modify existing cases.

In sum, the model-based reasoner predicts a likely root cause, or perhaps a plurality of likely root causes that should be checked. There is some degree of accuracy associated with this prediction. The case-based reasoner will tend to more accurately predict the likely root cause, provided it has a similar (but not exact) combination of faults previously stored. The combination of the two type reasoners thus provides a very accurate prediction. The hybrid approach provides pre-determination of a large quantity of maintenance scenarios, without having to rely solely on estimated rates, modes or probability. The efficiency of this hybrid approach allows maintenance personnel to troubleshoot a problem and fix it quickly.

The operation and construction of the model-based reasoner 64 may be generally as known in the art. For example, a product available under the trade name TEAMS is available from Qualtech Systems, Inc. Similarly, case-based reasoners are known in the prior art, and one possible case-based reasoner is available under the trade name SPOTLIGHT™ from CaseBank Technologies, Inc. Of course, the present invention would extend to other case-based reasoners and model-based reasoners.

It should be noted that a computing device can be used to implement various functionality, such as that attributable to the hybrid fault reasoning system. In terms of hardware architecture, such a computing device can include a processor, memory, and one or more input and/or output (I/O) device interface(s) that are communicatively coupled via a local interface. The local interface can include, for example but not limited to, one or more buses and/or other wired or wireless connections. The local interface may have additional elements, which are omitted for simplicity, such as controllers, buffers (caches), drivers, repeaters, and receivers to enable communications. Further, the local interface may include address, control, and/or data connections to enable appropriate communications among the aforementioned components.

The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory may incorporate electronic, magnetic, optical, and/or other types of storage media. Note that the memory can also have a distributed architecture, where various components are situated remotely from one another, but can be accessed by the processor.

The software in the memory may include one or more separate programs, each of which includes an ordered listing of executable instructions for implementing logical functions. A system component embodied as software may also be construed as a source program, executable program (object code), script, or any other entity comprising a set of instructions to be performed. When constructed as a source program, the program is translated via a compiler, assembler, interpreter, or the like, which may or may not be included within the memory.

The Input/Output devices that may be coupled to system I/O Interface(s) may include input devices, for example but not limited to, a keyboard, mouse, scanner, microphone, camera, proximity device, etc. Further, the Input/Output devices may also include output devices, for example but not limited to, a printer, display, etc. Finally, the Input/Output devices may further include devices that communicate both as inputs and outputs, for instance but not limited to, a modulator/demodulator (modem; for accessing another device, system, or network), a radio frequency (RF) or other transceiver, a telephonic interface, a bridge, a router, etc.

When the computing device is in operation, the processor can be configured to execute software stored within the memory, to communicate data to and from the memory, and to generally control operations of the computing device pursuant to the software. Software in memory, in whole or in part, is read by the processor, perhaps buffered within the processor, and then executed.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A fault reasoning system comprising:
a model-based reasoner to take in a plurality of fault signals, and predict a likely root cause for the plurality of fault signals based upon predictions developed utilizing a model of a particular piece of equipment;
a case database storing a plurality of prior fault signals, and associating a particular combination of fault signals with a particular root cause that has been identified in actual equipment in the past; and
a case-based reasoner having access to said case database, said case-based reasoner taking in the plurality of fault signals, and searching the case database for a prior case having a similar set of fault signals, with said case-based reasoner predicting a likely root cause if there is a prior case having a number of similar fault signals, and said model-based reasoner being utilized to predict a root cause when said case-based reasoner does not have such a previously stored case, and wherein the plurality of fault signals is fault codes initially sent to said model-based reasoner, and said model-based reasoner inverting the fault codes to predict likely root causes as isolation solutions to be sent to said case-based reasoner.

2. The system as set forth in claim 1, wherein said fault codes are also sent to said case-based reasoner.

3. The system as set forth in claim 1, wherein said fault reasoning system is programmed to identify root causes of problems with a gas turbine engine.

4. The system as set forth in claim 1, wherein said case database is updated when a unique set of fault signals is identified with a new case, and to relate that unique set of fault signals with a finally identified root cause.

5. The system as set forth in claim 1, wherein an output of the fault reasoning system is directed to a guided trouble-shooting tool to provide maintenance directives.

6. The system as set forth in claim 1, wherein said model-based reasoner and said case-based reasoner are included onto a computer.

7. The system as set forth in claim 1, wherein said case database is dedicated and mounted with said case-based reasoner.

8. The system as set forth in claim 1, wherein said case database is remotely accessible to said case-based reasoner.

9. A method of operating a fault reasoning system comprising:

taking in a plurality of fault signals and making predictions at a model-based reasoner developed utilizing a model of a particular piece of equipment;

storing a plurality of prior fault signals on a case database, and associating a particular combination of fault signals with a particular root cause that has been identified in actual equipment in the past; and allowing a case-based reasoner access to said plurality of prior fault signals, said case-based reasoner taking in the plurality of fault signals, and searching the case database for a prior case having a similar set of fault signals, with said case-based reasoner predicting a likely root cause if there is a prior case having a number of similar fault signals, and said model-based reasoner being utilized to predict a root cause when said case-based reasoner does not have such a previously stored case, and wherein said model-based reasoner inverting the fault signals to predict likely root causes as isolation solutions to be sent to said case-based reasoner.

10. The method as set forth in claim 9, wherein said plurality of fault signals are also sent to said case-based reasoner.

11. The method as set forth in claim 9, wherein said fault reasoning system is programmed to identify root causes of problems with a gas turbine engine.

12. The method as set forth in claim 9, wherein said case database is updated when a unique set of fault signals is identified with a new case, and to relate that unique set of fault signals with a finally identified root cause.

13. The method as set forth in claim 9, wherein an output of the fault reasoning system is directed to a guided trouble-shooting tool to provide maintenance directives.

14. The method as set forth in claim 9, wherein observations made by personnel are included with said plurality of fault signals and utilized to make said predictions at said model-based reasoner, and said case-based reasoner.

* * * * *